United States Patent
Byham et al.

(10) Patent No.: US 6,683,875 B1
(45) Date of Patent: Jan. 27, 2004

(54) NETWORK SWITCH INCLUDING RESTRICTION OF SOURCE ADDRESS LOOK-UPS BASED ON RECEIVE QUEUE LENGTH

(75) Inventors: Christopher Byham, Leighton Buzzard (GB); Justin A Drummond-Murray, Chorleywood (GB); Daniel M O'Keeffe, Ballyhooly (IE)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/564,792

(22) Filed: May 5, 2000

(30) Foreign Application Priority Data

Feb. 15, 2000 (GB) .............................................. 0003301

(51) Int. Cl.$^7$ .............................................. H04L 12/56
(52) U.S. Cl. ........................ 370/392; 370/230; 370/429; 711/216
(58) Field of Search ................................ 370/392, 235, 370/429, 423, 236, 412, 415, 389, 230; 707/3; 711/216

(56) References Cited

U.S. PATENT DOCUMENTS

| | | | |
|---|---|---|---|
| 5,708,659 A | | 1/1998 | Rostoker et al. ............. 370/392 |
| 6,223,172 B1 | * | 4/2001 | Hunter et al. .................. 707/3 |
| 6,510,138 B1 | * | 1/2003 | Pannell ........................ 370/236 |

FOREIGN PATENT DOCUMENTS

| | | |
|---|---|---|
| EP | 0 594 196 A1 | 4/1994 |
| GB | 2 337 659 A | 11/1999 |

* cited by examiner

Primary Examiner—John Pezzlo
(74) Attorney, Agent, or Firm—Nixon & Vanderhye P.C.

(57) ABSTRACT

A network switch which can perform in respect of addressed data packets source address and destination address look-ups in a forwarding database includes a control which inhibits the performance of source address look-ups if the length of a respective receive queue of packets is greater than a threshold. The inhibition may endure until the length of the receive queue falls below a second threshold lower than the first. The inhibition may not be applied if the respective receive queue is subject to head of line blocking

3 Claims, 4 Drawing Sheets

```
If ( (RxQueue > High watermark) and (no head of line blocking on this port) )
    do DA look-up only else if(doing DA only look-ups at present)
    {
        if (RxQueue < Low watermark)
            do DA and SA look-ups
        else
            do DA look-ups only }
    else
        do DA and SA look-ups
```

NETWORK SWITCH INCLUDING RESTRICTION OF SOURCE ADDRESS LOOK-UPS BASED ON RECEIVE QUEUE LENGTH

FIELD OF THE INVENTION

The present invention relates to network switches for packet-based communication systems such as Ethernet networks and to an improved method of operating such a network switch. The term 'switch' is intended to refer broadly to a device which receives data packets containing address data and which can internally switch those packets in response to that address data or modified forms of such data. The invention is intended to be applicable to a variety of different switch architectures, as indicated hereinafter.

BACKGROUND TO THE INVENTION (a) Traffic Queues

It is well known to form traffic queues of data packets in network switches. Their formation is necessary to provide temporal buffering of a packet between the time it is received at a network switch and the time at which it can be transmitted from the switch. In most forms of network switch, the switch has a multiplicity of ports, and data packets received at the ports may, after appropriate processing including look-ups in relation to destination and source addresses in the packets, be directed to a port or ports in accordance with that address data. Switches employing both media access control addresses (such as in bridges) or network addresses (such as in routers) are of course well known in the art. In such switches it is customary to provide temporal buffering both when the packets are received, in what are known as 'receive queues' and when they are assigned to transmit ports, in what are known as 'transmit queues'. In general, the transmission of packets from a transmit queue may depend on a variety of considerations, including possible congestion in a device to which the respective port is connected.

It is known to form queues of data packets in a variety of ways, including comparatively simple FIFOs established in hardware More usually in modern switches queues may be formed in random access memory employing read and write pointers under the control of a memory controller. If static random access memory is employed, a particular traffic queue may be allotted a defined memory space and packets may be read in to that memory space under the control of a read pointer which progresses from one location to another until it reaches the 'end' of the allotted memory space whereupon it recycles to the beginning of the memory space (on the assumption that the space is not fully occupied). A read pointer progresses through the memory space in a similar manner. In such systems the fullness of a memory space or thresholds representing some fraction of fullness need to be expressed in terms of the effective distance in terms of memory locations between the read and write pointers.

Another system is a dynamic memory comprising a plurality of identifiable buffers which can be allotted to a specific traffic queue under the control of a Free Pool Controller and Transmit (Tx) Pointer Manager, termed for convenience herein 'memory controller'. In such a system, any particular traffic queue may have initially some small number, such as two, of buffers allotted to it. If a queue requires more traffic space, then the memory controller can allot additional buffers to the queue. It is, as indicated for the previous example, possible to limit the available memory space by a limitation on the number of buffers employed for any particular queue, though it is known, and preferable in a variety of circumstances, to allow some traffic queues more space than others by imposing a different limit on the maximum number of buffers which can be used for that queue. In buffer systems, data may written into the buffers using a write pointer and read out from the relevant buffers using a read pointer. In general, the size of each buffer is substantially more than that of a single packet. Packets are normally stored in such buffers in the form of a status word (which would normally be read first), including some control data and also an indication of the size of the packet, followed by address data and message data. An interface which reads a packet from such a buffer store will, in a reading cycle. commence reading the status word and proceed to read the packet until the next status word is reached.

It should be understood that a traffic queue both in general and in relation to the present invention may be constituted indirectly, that is to say not by the packets that are in the queue but by respective pointers each of which points to a location containing the respective packet in the relevant memory space. In a scheme such as this, the receive and transmit queues are constituted by lists of pointers in respective memory space. The length of each queue may simply be determined by the number of pointers in the respective queue. When a pointer reaches the 'top' or 'head' of the queue, then, assuming the conditions for forwarding the respective packet have been met, the pointer is employed by the switching engine to retrieve the respective packet from the relevant memory location. In the present invention it is broadly of no consequence whether the traffic queues are constituted directly by the packets or by queues of pointers.

(b) Address Look-Ups

It is customary in most forms of network switch, in the broad sense used herein, to provide a forwarding table or database which contains entries relating address data in a packet to forwarding data enabling a switching engine to determine, usually by means of a port mask, the port or ports from which a packet should be forwarded. Forwarding databases may be established for media access control addresses (otherwise known as layer 2 addresses) or network addresses (layer 3 addresses) or both. In the specific example described hereinafter it will be assumed that the database employs media access control addresses but this is by way of illustration not limitation.

When a packet is received by a switch, in the particular example selected, it is customary to perform two look-ups. The look-ups may be performed while the packet is in a receive queue associated with the particular port by which the packet has been received. One look-up is in respect of the source address (SA) in the packet. The object of this look-up is to build up entries in the data table relating media access control addresses to the forwarding data (such as a port number). If the source address exists in the forwarding database no action need be required. In some switches it is customary to 'age' entries so that the database is not cluttered by addresses which are no longer in active use. In circumstances such as these even though a source address may exist in the database the entry may be updated.

The other look-up is in respect of the destination address (DA) in the packet. If the address exists in the database, the look-up retrieves the forwarding information (such as the port number) associated with that address so that the switching or forwarding engine can determine the port from which the packet should be forwarded and therefore direct the packet (or establish the relevant pointer) to the transmit queue for that particular port.

Although it is not directly relevant to the present invention, if the destination address look-up fails to find a match with an entry in the forwarding database, it is normally necessary to broadcast the packet to all possible ports. Further, although it is again not directly relevant to the present invention, a given packet may be destined, as in the case of a multicast transmission, for more than one port and therefore a packet in a given receive queue may ultimately produce entries in more than one transmit queue.

In most systems the learning process is performed by software, because the placing of a new address in a look-up table requires manipulation of the table that is difficult to perform in hardware. The difficulty partly arises because various techniques are employed to save memory space or to render destination address look-ups more rapid. For example, hashing of addresses may be employed so as to collapse 48-bit media access control addresses to 16-bit addresses in a pointer table, the pointers in such a table pointing to a linked list of entries in a look-up table. Hashing, is described in, for example, U.S. Pat. No. 5,708,659 and in British Patent Application Publication No. GB-2337659.

In any event, the rate of learning of new addresses in a high performance switch is very slow compared with the number of packets that pass through, or should pass through, the switch. Typically, learning rates tend to be limited to hundreds or thousands of addresses per second while the switch is handling literally millions of packets per second, as a general rule the rate of learning is at least one order of magnitude and typically several orders of magnitude less than the rate of packet throughput for which the switch is designed.

It would be possible to reduce the number of look-ups in the switch by performing a source address look-up for only some of the time, on an arbitrary basis. This would cause a situation wherein new source addresses may be missed because every packet is not being checked against the forwarding database. It is therefore desirable to provide a mechanism which reduces the likelihood of a new source address being missed while at the same time preventing what is known as a capture effect. Such an effect can arise wherein each time a packet with a given source address is seen the state machine which controls the look-up engine is in a 'don't check the source address' mode and so that address is never learned.

SUMMARY OF THE INVENTION

The present invention is based on a selective reduction in the performance of source address look-ups in a forwarding database. The principle is that the length of the receive (Rx) queue for a given port is used to determine if a source address (SA) look-up should be done. Thus in a lightly loaded system the Rx queues will never fill up and so an SA look-up can be done for every packet, while in a heavily loaded system the Rx queues will fill up and so the SA look-up can be inhibited.

In an optimal system the bandwidth of the ports should be such that there are 50% more ports' worth of bandwidth than the look-up can handle doing both DA and SA look-ups. Thus if a look-up engine were capable of doing DA and SA look-ups for ten 1-Gigabit ports then by using this technique it could support fifteen 1-Gigabit ports. This enables sufficient bandwidth to enable the Rx ports to recover when oversubscribed, because the look-up with only DA searches would have a bandwidth of twenty ports.

The system preferably takes into account other factors that also cause the Rx queues to fill up. If a switch is configured for lossless mode, then if a Tx (transmit) port fills up no more packets can be placed on the Tx queue and so head of line blocking occurs. This will in turn prevent packets being removed from the Rx queue and so cause the Rx queue to fill up. This situation is quite easy to detect and so in this scenario the SA look-ups would still be carried out even though the Rx queue is filling up.

As the number of packets in the queues is dependent on the speed of the look-up, ignoring head of line blocking, and in any port can switch to DA only look-up at any time, thus increasing the look-up bandwidth, it would be difficult for a capture effect to occur. The chances of capture effect can be reduced further by implementing hysteresis in the Rx queue such that DA only look-ups start when an upper watermark is reached but the DA and SA look-ups only start again when the Rx queue pointer reaches the lower watermark.

DETAILED DESCRIPTION

Figure 1:
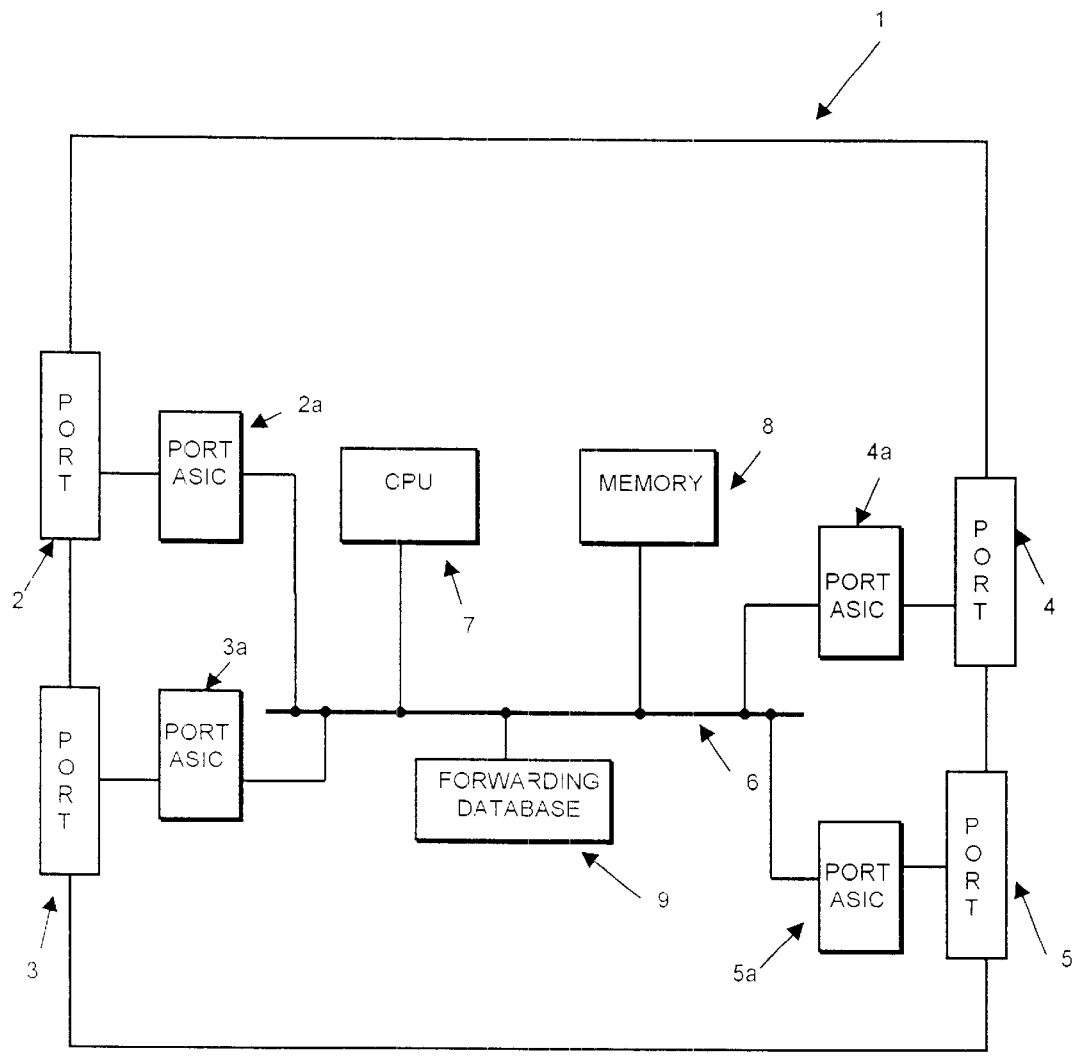
FIG. 1 illustrates schematically a network switch.

Although the specific construction of a switch is not necessarily an important feature of the invention, provided that the switch has both the storage ability and the processing ability that the invention requires, FIG. 1 is intended to show schematically the basic components of a switch that is suitable for use in the present invention. Typically, switches have twelve or twenty-four ports or even more. For the sake of simplicity, the switch 1 shown in FIG. 1 has only four ports, identified as ports 2, 3, 4 and 5.

If, as is preferred, the switch 1 is primarily a hardware switch, the various components within the switch 1, apart from most of the memory, be provided on a single ASIC (application specific integrated circuit). However, for ease of explanation, the various components of the switch are separately shown in FIG. 1. In this example therefore, each of the ports 2, 3, 4 and 5 has a respective 'port ASIC', 2a, 3a, 4a and 5a respectively. These components include the media access control devices (MACs) which perform (known) operations on packets entering and leaving the switch while the packets are in a format independent of the particular transmission medium to which a respective port is connected. The port ASICs also include a 'physical layer device' which not only converts packets from a media independent format to a format appropriate for the particular transmission medium but also includes various other functions such as for example auto-negotiation, particularly in the case of 'Ethernet' networks described in IEEE Standard 802.3.

The switch 1 includes a bus system 3 by means of which packet data and control and status data are conveyed between the various components of the switch. The switch includes a look-up engine, the operation of which will be described later, a memory 8 which may be employed for the temporary storage of packets in 'queues' before they are sent to their destination ports, a forwarding database 9, which will be described with reference to FIG. 6, and a switching engine. The switching engine will retrieve packets temporarily stored in memory 8 and direct them to respective ports in accordance with, for example, a port mask obtained from a relevant entry in the forwarding database 9. It is assumed in relation to FIG. 1 for the sake of simplicity that both the switching engine and the look-up engine are constituted by a CPU 7 but, as previously indicated, a variety of well-known architectures may be employed.

Figures 4, 6:
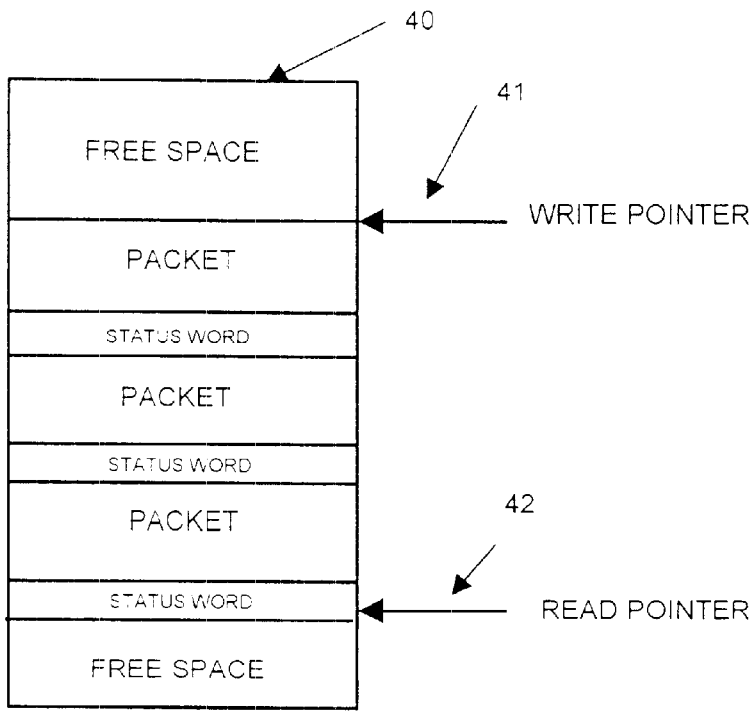
FIG. 4 illustrates a storage of packets in a queue.
FIG. 6 illustrates a control routine forming part of the process shown in FIG. 3.

As previously indicated, the switch forms for each port that receives packets a respective receive (Rx) queue and for each port that is to forward packets a respective transmit (Tx) queue. These may be constituted as shown in FIG. 4 wherein 40 denotes the relevant memory space, the queue of packets being formed between a write pointer 41 and a read pointer 42 When the write pointer reaches the 'top' of the relevant memory space it will recycle to the bottom thereof Each entry consists of the packet and an associated status word. In this form of queue, the separation between the write pointer and the read pointer denotes the length of the queue. This may be compared against selected values (known as watermarks') to provide signals denoting that the length exceeds a given maximum desired length (the 'high watermark') or is less than the lesser length (the 'low watermark').

However, it is equally possible to constitute the queues by means of pointers, i.e. data words each of which identify a storage location in memory, that storage location containing the respective packet and the status data associated with it. In this case each Rx queue and each Tx queue may be a list of pointers, each delimited by a start (or read) pointer and a finish (or write) pointer. Both ways of establishing traffic queues are known in the art.

Figure 2:
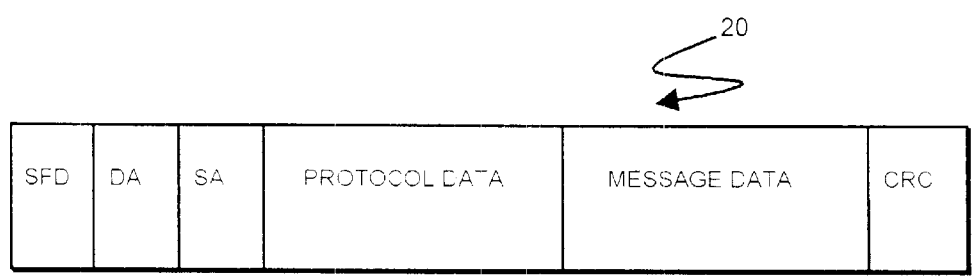
FIG. 2 illustrates schematically an addressed data packet.

FIG. 2 illustrates in simplified schematic form a typical packet 20 employed for the conveyance of data in a packet-based data communication system in which a switch such as switch 1 may form part. The packet comprises a start-of-frame delimiter (SFD), media access control address information, comprising a destination address (DA) and a source address (SA), protocol data, message data and cyclic redundancy check (CRC) data. The media access control addresses define, if they are present, the source and destination devices in one 'hop' of a packet The protocol data includes network address data defining, for example, the network to which the ultimate destination of the packet belongs and usually also an identification of a device within that network. The message data need not be present, as in the case of a control packet or frame.

Figure 3:
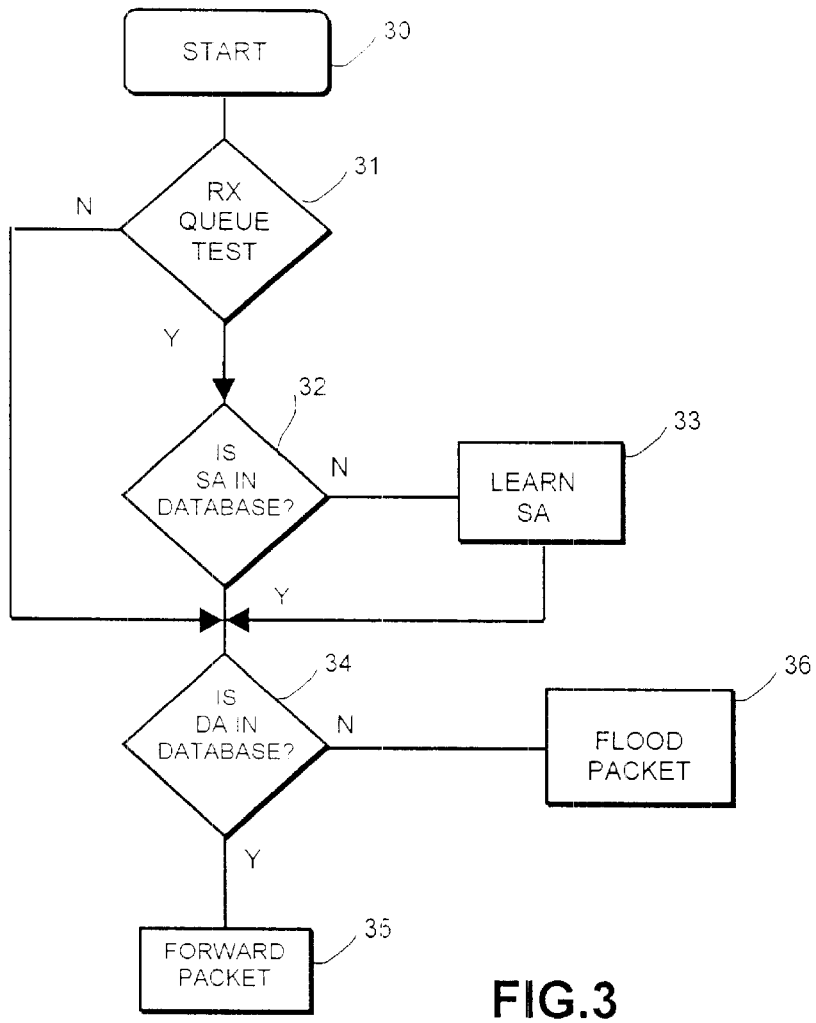
FIG. 3 is a flow chart of a look-up process in accordance with the invention.

FIG. 3 illustrates mostly the look-up process for MAC addresses typical of a network switch. Ignoring for the present stage 31, the process is known in the art. A packet is received, stage 30, and a look-up 32, performed by means of the look-up engine in forwarding database 9, determines whether the source address (SA) is already the subject of an entry in the database. If it is not, then the address is 'learned' (stage 33), that is to say made the subject of a table entry including an identification of the port on which the packet was received and (usually) a VLAN number. If the switch is to be used for routing (layer 3 switching) as well as bridging (layer 2 switching), an entry will typically include the protocol (IP) address of the packet.

In order to determine where the packet should be sent, a further look-up is made (stage 34) to find a match for the destination address (DA) in the database. If the address is found, then the packet may be forwarded (stage 35) from the port associated with that MAC address in the forwarding database. For this purpose the entry is read out from the forwarding database and fed under to control of the switching engine to the relevant port.

It is not necessary for the SA and DA look-ups to be performed in the specific order shown in FIG. 3.

If it should happen that the destination MAC address is not in the forwarding database, it is normally necessary to 'flood' or 'broadcast' the packet (stage 36). By this is meant that a copy of the packet is supplied to all (or all of a selected plurality) of the ports in order to obtain an ARP (address resolution protocol) response from a device having the network address identified in the packet. That device will respond with its MAC address and enable this address to be learned in respect of the relevant port in the forwarding database.

The significance of the additional control stage 31 in the process shown in FIG. 3 will be explained with reference to FIGS. 5 and 6.

Figure 5:
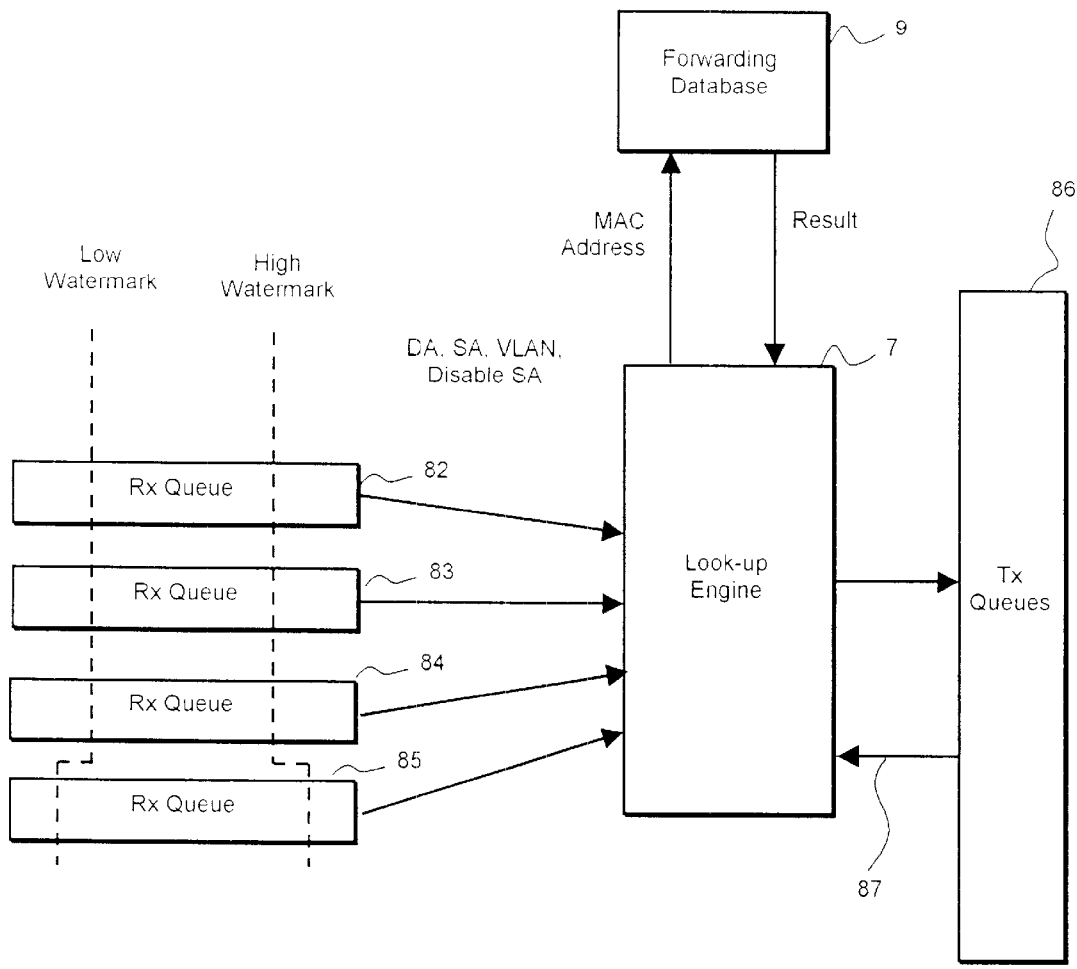
FIG. 5 illustrates the operation of a switch in accordance with the invention.

FIG. 5 illustrates a look-up engine 7 and forwarding database 9 which may be as described with reference to FIG. 1. It also shows a multiplicity of receive (Rx) queues 82 to 85 (one for each of the ports 2 to 5) established in memory 8 (or in memory associated with each of the port ASICs), and a multiplicity of transmit (Tx) queues 86 also established in memory 8 or otherwise as desired. Thus a packet received at port 2 will be entered (directly or indirectly) in queue 82 while look-up engine 7 performs the look-up process (FIG. 3) in database 9.

Each of the receive queues has a high watermark and a low watermark defined as previously described or otherwise according to preference. Since these watermarks define queue lengths numerically it is obvious that they may be different for the various queues as shown by the different watermarks for queue 85. They may also be adjustable and may be adjusted under software control commanded remotely by way of a management port connected to a network management entity.

When a packet enters the queue, the destination address (DA), source address (SA) and, preferably, a VLAN number are read for use by the look-up engine 7 in conjunction with the database 9.

Stage 31 in FIG. 3 represents the test made on the length of the Rx queue to determine either that there should be an SA look-up, in which case the look-up engine proceeds to stage 32, or the SA look-up should not occur, in which case the look-up engine proceeds to stage 34.

It would be possible to constitute stage 31 by a comparatively simple algorithm which relied only on the length of a receive queue as a criterion for allowing or permitting a source address look-up. Thus an SA look-up could be inhibited if the Rx queue exceeded the high watermark, the inhibition remaining until the length of that Rx queue diminished below the low watermark. However, it is desirable to take into account head-of-line blocking. This describes the phenomenon wherein a Tx queue for which a packet at the head of a receive queue is destined is full (according to selected criteria) and therefore the packet (or its pointer) cannot be transferred to the Tx queue. In turn this prevents the forwarding of subsequent packets in the queue to other transmit queues whether those other transmit queues are full or not. It is known for the existence of a full Tx queue to be signalled across the switch to a look-up engine a means for such signalling is indicated schematically in FIG. 5 by line 87. If a receive queue is subject to head of line blocking, it is unnecessary to speed up operation by omitting SA look-ups and so in the presence of head of line blocking the SA look-ups may be allowed even though the high watermark is exceeded.

The additional control stage 31 preferably therefore implements (for example by means of the CPU or a state machine) an algorithm having the following features:

(a) If the receive queue exceeds the high watermark and there is no head of line blocking for this queue (i.e. this receive port) then SA look-ups will be inhibited.

(b) If condition (a) is not met, then if SA look-ups are inhibited, and the receive queue is below the watermark, SA look-ups will recommence (in addition to the DA look-ups). If the queue length is still above the low watermark, SA look-ups will still be inhibited.

(c) If neither (a) nor (b) apply, both DA and SA look-ups will be performed.

This algorithm is summarized in FIG. 6, and will be the basis of a state machine controlling stage 31 of the look-up process in FIG. 3. The 'Y' response to stage 31 in FIG. 3 indicates that SA look-ups shall be performed whereas the 'N' response indicates that SA look-ups shall not be performed.

What is claimed is:

1. A network switch comprising a multiplicity of ports for receiving and forwarding addressed data packets each having a destination address and a source address, means for storing packets; means for defining, in respect of each port in said multiplicity of ports; a respective receive queue identifying those addressed data packets of said addressed data packets which are received in sequence by said each port, a forwarding database for containing entries composed of packet addresses and forwarding data; a look-up engine for performing, in respect of a received packet while said received packet is in said respective receive queue, a look-up in said database for the source address and the destination address of said received packet; means for indicating a length of said respective receive queue; and means responsive to the length of the said respective receive queue to prevent the performance of said look-ups of said source addresses of said received packets when said length exceeds a threshold.

2. A network switch according to claim 1 wherein said look-up engine recommences the performance of said look-ups of said source addresses when the length of the respective receive queue falls below a respective second threshold denoting a shorter length than the first-mentioned threshold.

3. A network switch according to claim 1 wherein the look-up of said source addresses is permitted, even when said length exceeds the first mentioned threshold, when forwarding of said packet at the head of said respective queue is blocked.

* * * * *